United States Patent [19]
Iwaki et al.

[11] Patent Number: 5,173,815
[45] Date of Patent: Dec. 22, 1992

[54] RECORDING POSITION COMPENSATION CIRCUIT FOR USE IN DIGITAL INFORMATION RECORDING-REPRODUCTION APPARATUS

[75] Inventors: Tetsuo Iwaki; Hidetaka Mizumaki; Chiaki Yamawaki, all of Nara, Japan

[73] Assignee: Sharp Kabushiki Kaisha, Osaka, Japan

[21] Appl. No.: 674,207

[22] Filed: Mar. 25, 1991

[30] Foreign Application Priority Data

Mar. 27, 1990 [JP] Japan .................................. 2-80378

[51] Int. Cl.⁵ .............................................. G11B 5/09
[52] U.S. Cl. ........................................ 360/54; 360/32
[58] Field of Search ............................ 360/13, 32, 54

[56] References Cited

U.S. PATENT DOCUMENTS 4,819,087 4/1989 Takeuchi et al. ...................... 360/13

FOREIGN PATENT DOCUMENTS 56-148775 11/1981 Japan .
25267 1/1990 Japan .

Primary Examiner—Vincent P. Canney

[57] ABSTRACT

A recording position compensation circuit for use in the digital information recording-reproduction apparatus of the present disclosure has a microprocessor for generating an offset signal indicating a deviation between standard signal processing time, which is required for a process wherein digital medium information already recorded on the recording medium is reproduced through the advanced reproduction head and re-recorded on the recording medium through the recording head, and inter-head travelling time required for the recording medium to travel a distance from the advanced reproduction head to the recording head. A first counter generates a reference symbol pointer indicating a reference of a sequence whereby digital information stored in the memory is read out so that a part of the digital information is rewritten. A second counter generates a compensated symbol pointer having a phase difference corresponding to the deviation with respect to the reference symbol pointer. Thus, since digital information is read out from the memory so that the signal processing time from reproduction to re-recording may coincide with the inter-head travelling time, a recording position on the recording medium at which rewriting is performed, is corrected.

16 Claims, 7 Drawing Sheets

RECORDING POSITION COMPENSATION CIRCUIT FOR USE IN DIGITAL INFORMATION RECORDING-REPRODUCTION APPARATUS

FIELD OF THE INVENTION

The present invention relates to a digital information recording-reproduction apparatus for recording digital information such as audio PCM signals on a magnetic tape, magnetic disk, or other medium. More particularly to a recording position compensation circuit for use in the digital information recording-reproduction apparatus, which corrects a recording position so as not to be dislocated when a part of recorded audio information is rewritten.

BACKGROUND OF THE INVENTION

A digital audio tape recorder (hereinafter referred to as DAT) for recording, for example, sound in PCM (Pulse Code Modulation) system, is adapted to record PCM data having error-correcting codes added thereto in order to correct or interpolate errors in the PCM data caused by scratches or adhesion of dust on the magnetic tape. Moreover, since a correction capability for one data sequence is restricted, the PCM data is interleaved, and recorded in a dispersed manner so that errors are not concentrated on one specific data sequence. Therefore, in reproduction, after correcting the data for errors, the dispersed data is returned to its original sequence. The process for returning the dispersed data to its original sequence is referred to as "deinterleaving".

On the other hand, some DATs, such as those for professional use, have an editing function for replacing a part of recorded sound with another sound. The above editing function is referred to as "punch in/out". In order to execute the editing function, as illustrated in FIG. 5(a), there are installed a advanced reproduction head 15, recording head 16 and a signal processing circuit including a memory 17. The advanced reproduction head 15 is disposed at the upstream side of a magnetic tape 18 so as to read out PCM data from the magnetic tape 18. The recording head 16 is disposed at the downstream of the advanced reproduction head 15, with a predetermined distance therefrom. The memory 17 stores the PCM data read out by the advanced reproduction head 15. In the above arrangement, punch-in/out operations are performed as follows.

First, a normal reproducing operation will be described hereinbelow. PCM data on the magnetic tape 18 is read out by the advanced reproduction head 15 (additionally, in FIG. 5(a) and FIG. 6(a), rectangular areas arrayed on the memory 17, magnetic tape 18 and punch-in data 19 which will be described later, as well as numerals attached to the areas represent data blocks and block numbers respectively.) The PCM data having been read out is successively stored in the memory 17. The PCM data stored in the memory 17 is on the one hand reproduced to be released as sound after having been applied thereto predetermined signal processing operations such as error correcting, and is on the other hand successively read out from the memory 17 and re-recorded on the magnetic tape 18 through the recording head 16. In this case, the arrangement is made such that signal processing time required for the PCM data to be read out from the magnetic tape 18 and re-recorded on the magnetic tape 18 is equal to inter-head travelling time required for the magnetic tape 18 to travel a distance from the advanced reproduction head 15 to the recording head 16. With the arrangement, since the PCM data read out from the magnetic tape 18 is re-recorded on the same position of the magnetic tape 18 where the reading-out operation was performed, the position of the PCM data on the magnetic tape 18 is not changed before and after the re-recording.

Next, in editing operation for rewriting a part of PCM data into another PCM data, an input to the recording head 16 is switched from a reproduced audio signal to an audio signal to replace with (punch-in). Upon finishing the rewriting, the input to the recording head 16 is switched again to the reproduced audio signal from the advanced reproduction head 15 (punch-out), thereby permitting the part of recorded sound to be replaced with another sound. For example, as shown in FIG. 5(a), punch-in data 19 consisting of blocks 0 to 2 are those edited and overwritten on the position corresponding to the blocks 0 to 2 on the magnetic tape 18.

For ideal punch-in/out operations as described above, the interleaving sequence of the data would possess an accurate continuity as is shown in FIG. 5(b), and error correction and interpolation would be performed precisely. Further, by adopting the cross-fade method or the like, a smooth switchover between the reproduced audio signal and the audio signal to replace with may be achieved. Therefore, no noise would be generated at the punch-in point and punch-out point.

However, in actual operations, the inter-head travelling time is not necessarily equal to the signal processing time due to variation of the inter-head distance, deviation of the tape speed, or stretch or shrinkage of the tape after recording. For this reason, as shown in FIG. 6(a), the recording position of the punch-in data 19 is sometimes dislocated from a desired position on the magnetic tape 18 for rewriting. When this happens, as shown in FIG. 6(b), the interleaving sequence of the data shows discontinuity before and after the punch-in/out point. When returned to the original sequence, a discontinuous portion of the data is directly deinterleaved, and therefore it makes unusual data retaining no correlation to the original PCM data existing before and after it. Further, since errors on the discontinuous portion of the data are beyond its error-correction capability, noise is generated during reproduction.

As described above, in order to perform deinterleaving, the following methods (1) and (2) are adopted: (1) data is divided into blocks with respective block numbers attached; (2) when reproducing the data recorded on the tape in a dispersed manner, they are rearranged based on the block numbers. However, lost data due to the dislocation of the recording position (such as that shown in FIG. 6(a) as a block number 3) are all recognized as errors in the interleaving sequence as is shown in FIG. 6(c), and therefore the number of lost data tends to exceed the limitations of the correction and interpolation capabilities. The inclusion of noise into the reproduced sound is due to a number of data which are thus released with errors remaining therein. Moreover, the interleaving sequence of edited data on the tape remains discontinuous such that the error-correcting operation during reproduction must be performed based on the discontinuous interleaving sequence. This results in a lowering of the correction capability even on errors normally produced due to drop-out of data, scratches or dust on the tape, noise, etc.

In the conventional devices, in order to eliminate the above problems, high accuracy and strict performances are required in dimensions of inter-head distance, speed control for the tape, stretch or shrinkage properties of the tape, etc. For this reason, there are presented such problems as follows: work efficiency in assembling the recording-reproduction apparatus is lowered; interchangeability of the magnetic tapes is not fully achieved; it is difficult to maintain enough performances required for the magnetic tapes for a long period.

SUMMARY OF THE INVENTION

It is an object of the present invention to provide a recording position compensation circuit for use in a digital information recording-reproduction apparatus, which corrects a dislocation of a recording position caused by deviations on the mechanism, stretch or shrinkage of a recording medium, or other reasons when a part of information recorded on the recording medium is rewritten, and thus permits continuity of an interleaving sequence of data to be maintained.

It is another object of the present invention to provide a recording position compensation circuit for use in a digital information recording-reproduction apparatus, which achieves the foregoing object by the use of a simpler circuit configuration.

In order to achieve the above objects, the recording position compensation circuit for use in the digital information recording-reproduction apparatus in accordance with the present invention is characterized in comprising at least the following means:

(a) advanced reproduction head means disposed at a upstream position in a travelling path of a recording medium;

(b) recording head means disposed at a downstream position in the travelling path of the recording medium;

(c) memory means for successively storing in a predetermined address digital information to be recorded on the recording medium through the recording head means;

(d) offset generation means (for example, a microprocessor) for generating an offset signal indicating a deviation between standard signal processing time, which is required for a process wherein digital medium information already recorded on the recording medium is reproduced through the advanced reproduction head means and re-recorded on the recording medium through the recording head means, and inter-head travelling time which is required for the recording medium to travel a distance from the advanced reproduction head means to the recording head means;

(e) reference read-out sequence generation means (for example, A-counter) for generating a reference sequencing signal indicating a reference of a sequence whereby the digital information stored in the memory means is read out so that a part of the medium information is rewritten through the recording head means;

(f) compensation read-out sequence generation means (for example, B-counter) for generating a compensation sequencing signal indicating an actual sequence whereby the digital information stored in the memory means is read out so that a part of the medium information is rewritten through the recording head means;

(g) phase difference generation means (for example, comparator) for generating a phase difference signal which brings about a phase difference corresponding to a deviation indicated by the offset signal between the reference sequencing signal and the compensation sequencing signal; and (h) address generation means (for example, interleaving circuit) for specifying an address in the memory means required for reading out the digital information stored in the memory means, based on the compensation sequencing signal.

In the above arrangement, if there is any difference between inter-head travelling time required for the recording medium to travel a distance from the advanced reproduction head means to the recording head means and standard signal processing time required from the reproduction until the re-recording of medium information from and onto the recording medium, the offset means generates an offset signal indicating a deviation therebetween. The phase difference generation means generates a phase difference signal according to the offset signal. The phase difference signal brings about a phase difference corresponding to the deviation indicated by the offset signal between a reference sequencing signal generated by the reference read-out sequence generation means and a compensation sequencing signal generated by the compensation read-out sequence generation means.

When rewriting a part of medium information on the recording medium through the recording head means, digital information, which is to be released to the recording head means, is successively read out from the memory means. In this case, the address generation means specifies an address in the memory means according to the compensation sequencing signal.

In other words, when there is no deviation between the inter-head travelling time and the standard signal processing time, no phase difference is brought about between the reference sequencing signal and the compensation sequencing signal. Therefore, digital information is read out from the memory means by the recording head means according to a reference read-out sequence. On the other hand, if the inter-head travelling time is longer than the standard signal processing time, compensation is performed so that an actual read-out sequence may proceed slower than the reference read-out sequence. If the inter-head travelling time is shorter than the standard signal processing time, compensation is performed so that an actual read-out sequence may proceed faster than the reference read-out sequence. Thus, the digital information is read out from the memory means by the recording head means according to the corrected read-out sequence. As a result, signal processing time from the reproduction of medium information until the re-recording thereof is permitted to constantly coincide with actual inter-head travelling time, and therefore it is avoidable to have the problem that digital information might be recorded in a position dislocated from a desired position on the recording medium for rewriting.

For a fuller understanding of the nature and advantages of the invention, reference should be made to the ensuing detailed description taken in conjunction with the accompanying drawings.

BRIEF DESCRIPTION OF THE DRAWINGS

FIGS. 1 to 4 show one embodiment of the present invention.

FIG. 1 is a block diagram showing an arrangement of a symbol pointer generation circuit installed in a recording circuit of a professional use S-DAT.

FIG. 2 is a block diagram showing an arrangement of an essential part of the S-DAT.

FIG. 6(a) is an explanatory diagram showing data arrays on a magnetic tape and a memory in the case where a recording position is dislocated due to an error associated with an inter-head distance.

DESCRIPTION OF THE EMBODIMENTS

The following description will discuss one embodiment of the present invention referring to FIGS. 1 to 4. The embodiment deals with a professional use DAT of fixed head type (hereinafter referred to as S-DAT) as a digital information recording-reproduction apparatus in accordance with the present invention.

Figure 2:
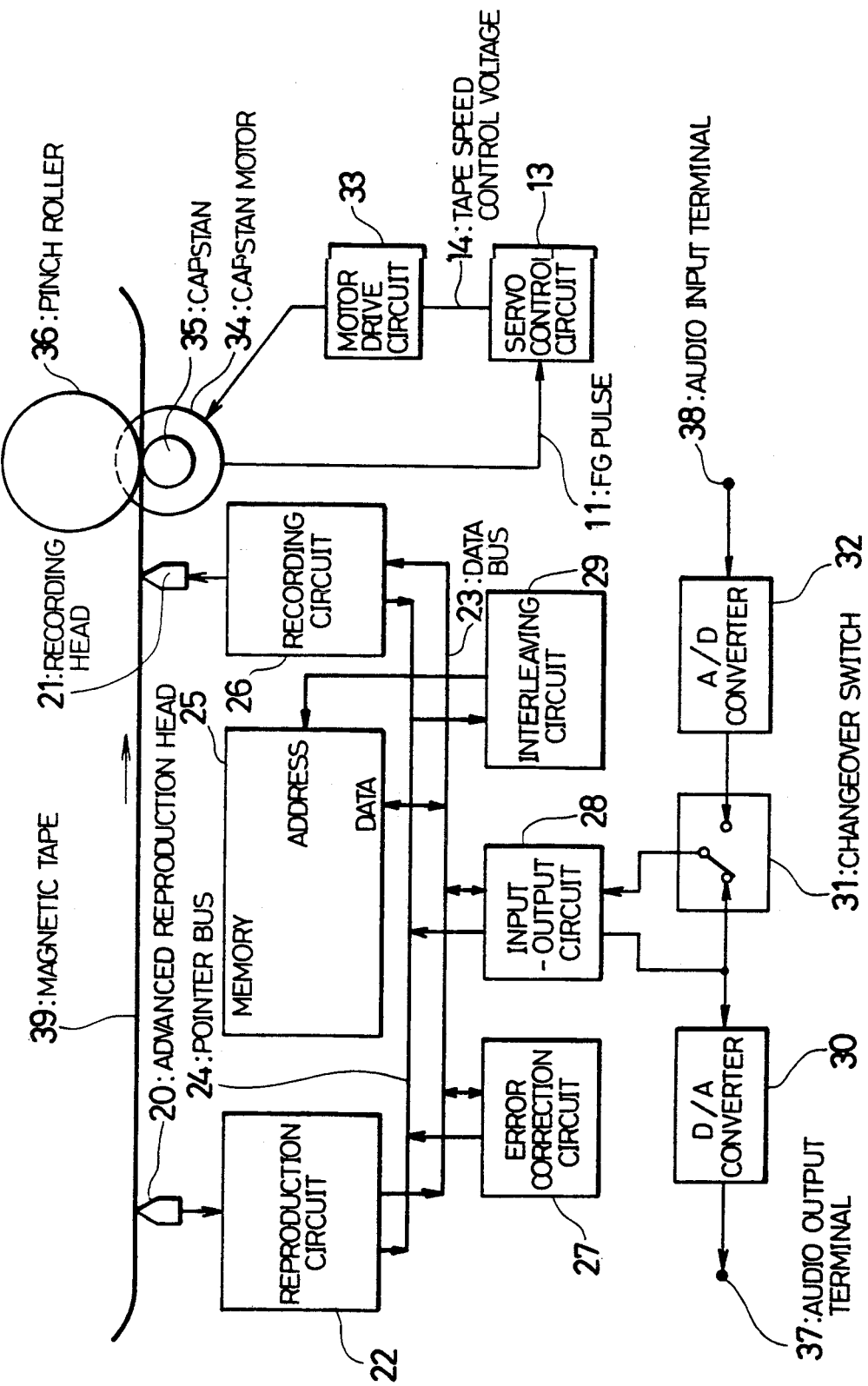

As shown in FIG. 2, the S-DAT is provided with a advanced reproduction head 20 disposed at an upstream side of a travelling path of a magnetic tape 39 as a recording medium and a recording head 21 disposed at a downstream side thereof with a predetermined distance. The magnetic tape 39, which is depressed by a pinch roller 36 onto a capstan 35 driven by a capstan motor 34, is sent from the advanced reproduction head 20 side to the recording head 21 side at a speed substantially identical to a circumferential rotation speed of the capstan 35.

While being rotated by a motor drive circuit 33, the capstan motor 34 releases to a servo control circuit 13 a signal (for example, an FG pulse 11 composed of a pulse train) in response to its rotation speed, that is, the speed of the magnetic tape 39. The servo control circuit 13 generates a tape speed control voltage 14 based on the FG pulse 11, and releases it to the motor drive circuit 33. Thus, the travelling of the magnetic tape 39 is controlled so that reproduced data may be obtained at a predetermined standard reproduction bit rate $R_o$.

PCM data recorded on the magnetic tape 39 is read out by the advanced reproduction head 20 before passing through the recording head 21. Here, a position on the magnetic tape 39 where the reading was performed, is referred to as a read-out position. The data read out is converted into reproduction information symbols in a reproduction circuit 22. The reproduction information symbols are on the one hand stored in a memory 25, and on the other hand released to an audio output terminal 37 through an input-output circuit 28 and a D/A converter 30, after having been subjected to a predetermined signal processing.

Meanwhile, the reproduction information symbols stored in the memory 25 are successively read out in synchronism with a time interval required for the read-out position to reach the recording head 21 with the travel motion of the magnetic tape 39. The reproduction information symbols read out from the memory 25 are re-recorded on the magnetic tape 39 through a recording circuit 26 and the recording head 21, after having been subjected to a predetermined signal processing. Moreover, an external audio signal is supplied to the input-output circuit 28 through an audio input terminal 38, an A/D converter 32 and a changeover switch 31. Punch-in/out operations for partially replacing recorded information on the magnetic tape 39 with the audio signal from the audio input terminal 38, are performed by means of the changeover switch 31, yet the detailed description thereof will be made later.

Through a data bus 23, data input-output terminal of the memory 25 is connected to an output terminal of the reproduction circuit 22, an input terminal of the recording circuit 26, an input-output terminal of an error correction circuit 27 and an input-output terminal of the input-output circuit 28. The data bus 23 is used for transmitting information symbols such as reproduction information symbols or external input symbols. On the other hand, an address input terminal of the memory 25 is connected to each output terminal of the reproduction circuit 22, the recording circuit 26, the error correction circuit 27 and the input-output circuit 28, through a pointer bus 24 and an interleaving circuit 29. The pointer bus 24 is used for transmitting various pointers which are used in processes such as a reading process for information symbols from the memory 25, writing process for information symbols to the memory 25 and error-correcting process. Pointers to be entered to predetermined addresses in a ROM 7, which will be described later, installed in the interleaving circuit 29, are selected depending on whether the memory 25 is used for reading information symbols or for other process.

Figure 1:
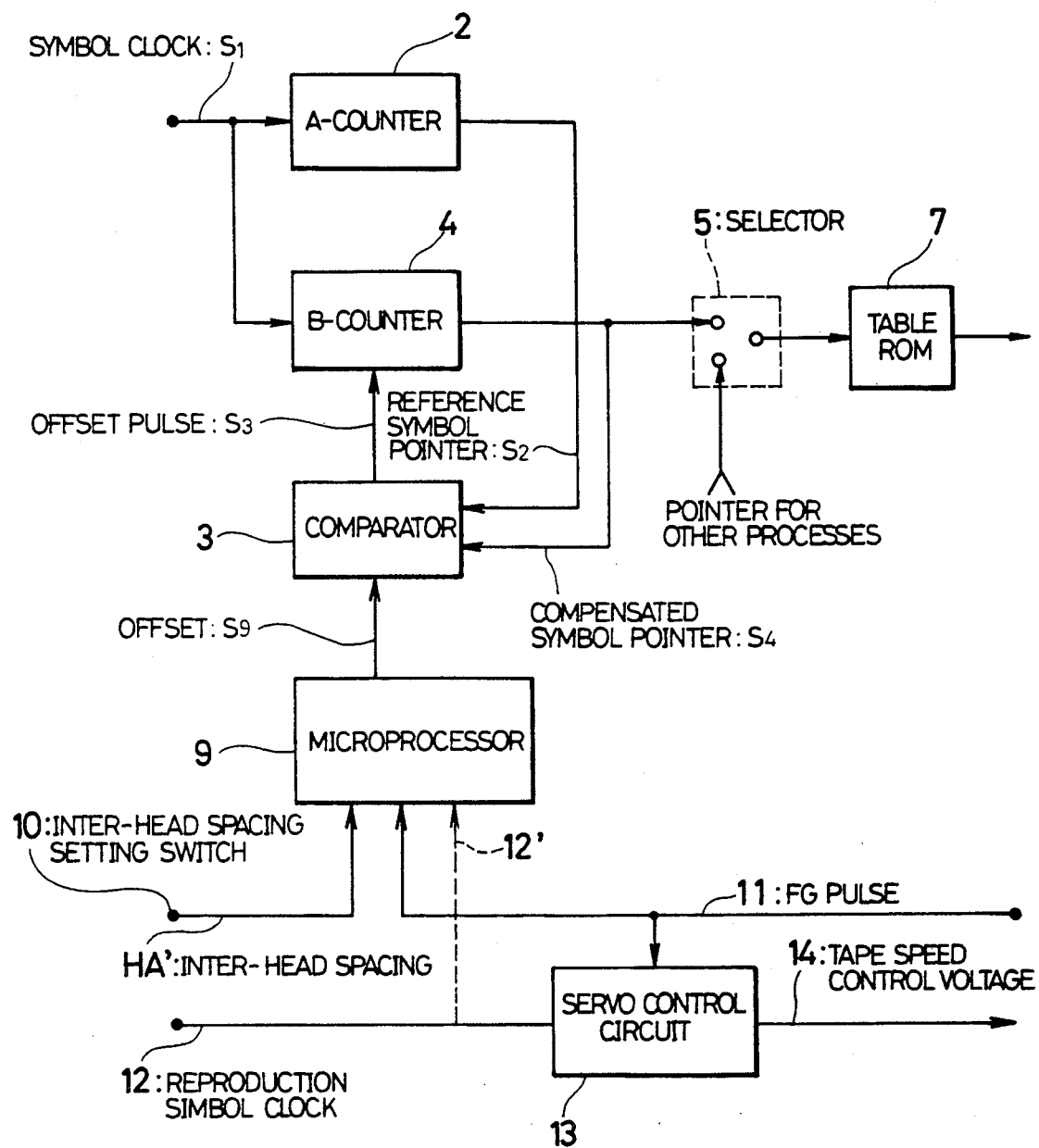

The reproduction circuit 22 which has the known data reproduction function for composing reproduction information symbols from data read out by the advanced reproduction head 20 from the magnetic tape 39, is also provided with a symbol pointer generation circuit for generating a sequencing signal (symbol pointers) which is required to read out from the memory 25 information symbols to be released to the recording circuit 26. As shown in FIG. 1, the symbol pointer generation circuit is provided with an A-counter 2 as reference read-out sequence generation means, a B-counter 4 as compensation read-out sequence generation means, a microprocessor 9 as offset generation means and a comparator 3 as phase difference generation means. The A-counter 2 which is composed of the known counter, counts pulses of a symbol clock $S_1$ generated in the S-DAT so as to provide timely control of transmission of information symbols to the recording circuit 26. With the arrangement, suppose that signal processes are performed under optimum standard conditions, the A-counter 2 generates a reference sequencing signal S₂ (hereinafter referred to as a reference symbol pointer) indicating a reference of a sequence under which information symbols to be released to the recording circuit 26 are read out from the memory 25. Here, the above standard conditions are denoted as follows: HA: standard distance between the advanced reproduction head 20 and the recording head 21; $V_o$: standard tape speed; $R_o$: standard reproduction bit rate; $T_2$: standard signal processing time required from the reproduction until the re-recording of digital information from and onto the magnetic tape 39. In addition, the symbol clock $S_1$ is generated based on the standard reproduction bit rate $R_o$.

The B-counter 4 is the known counter as well as the A-counter 2, and releases the same number of bits as the A-counter 2 does. When the B-counter 4 counts the same symbol clock pulses as the A-counter 2 and further has the same initial value, a compensated sequencing signal S₄ (hereinafter referred to as a compensated symbol pointer) generated by the B-counter 4 becomes identical in its contents to the reference symbol pointer S₂ generated by the A-counter 2. Further, when a phase difference signal S₃ (hereinafter referred to as an offset pulse) is entered to the B-counter 4 from the comparator 3, the B-counter 4 is reset so as to permit the compensated symbol pointer S₄ to return to zero (initial value), thereby starting re-counting. The offset pulse S₃, which will be described later, is generated by the comparator 3 so as to provide a correcting operation for permitting the compensated symbol pointer S₄ to have a predetermined phase difference to the reference symbol pointer S₂. On the other hand, the microprocessor 9 stores as parameters, for example, the aforementioned inter-head distance HA, standard tape speed $V_o$, standard reproduction bit rate $R_o$ and standard signal processing time $T_2$, and generates an offset signal S₉ which is described hereinbelow. The offset signal S₉ represents the number of symbol clock pulses corresponding to a deviation $(T_1' - T_2)$ between an actual inter-head travelling time $T_1'$ required for the magnetic tape 39 to travel from the advanced reproduction head 20 to the recording head 21 and the standard signal processing time $T_2$. The inter-head travelling time $T_1'$ is calculated by the microprocessor 9 based on an actual inter-head distance HA' entered through an inter-head distance setting switch 10, a tape speed deviation $v_1$ obtained through the FG pulse 11 from the capstan motor 34, the standard tape speed $V_o$ and other factors. Concrete examples of the calculation with respect to these offset signal S₉ and inter-head travelling time $T_1'$ will be described later.

The comparator 3 compares the reference symbol pointer S₂ and the compensated symbol pointer S₄, and releases the offset pulse S₃ to the B-counter 4 so that a difference between a phase (read-out sequence) of the reference symbol pointer S₂ and a phase (read-out sequence) of the compensated symbol pointer S₄ may correspond to the number of symbol clock pulses entered thereto from the microprocessor 9 as the offset signal S₉.

In addition, the pointer bus 24 is shown as a selector 5 in FIG. 1. A pointer to be entered to a predetermined address in the interleaving circuit 29 is selected through the selector 5 depending on which process the memory 25 is used for. Further, the interleaving circuit 29 is provided with, for example, a ROM 7 as address addition means, as shown in FIG. 1. A pointer entered to the ROM 7 is converted into an address on the memory 25 based on a table stored in the ROM 7.

The following description will discuss the operation of the S-DAT.

Data is divided and recorded onto, for example, 20 tracks on the magnetic tape 39. The recorded data is composed of PCM data and an additional redundant section including a parity symbol as an error-correcting code, a frame address (block number), a pattern for synchronization, etc. The PCM data is obtained by successively sampling audio signals of two channels (right and left) by the use of a sampling frequency 48 KHz and by quantizing each of them with 16 bits.

During reproduction, the PCM data picked up by the advanced reproduction head 20 is converted into a reproduction information symbol in the reproduction circuit 22. This symbol is successively recorded in the memory 25 through the data bus 23 in synchronism with the symbol clock $S_1$. At this time, a write address is determined by the interleaving circuit 29 based on a symbol pointer entered to the interleaving circuit 29 through the pointer bus 24 from the reproduction circuit 22, and then sent to the memory 25.

Furthermore, errors contained in the data stored in the memory 25 are detected and corrected by the error correction circuit 27, and the data whose errors have been corrected is sent to the input-output circuit 28 in accordance with the interleaving sequence. Memory addresses for this compensation process and deinterleaving process are also determined by the interleaving circuit 29. The corrected data sent to the input-output circuit 28 is subjected to a required interpolation operation, and forms reproduction information data. The reproduction information data is converted into an analog signal by the D/A converter 30, and released through the audio output terminal 37.

On the other hand, during recording, either external audio data converted into PCM data through the audio input terminal 38 and A/D converter 32 or the reproduction information data produced by the reproduction circuit 22 and other circuits is selected by the changeover switch 31, and then entered to the input-output circuit 28. Thereafter, either the external audio data or reproduction information data from the input-output circuit 28 is recorded in the memory 25 by the interleaving circuit 29 in accordance with the interleaving sequence. The error correction circuit 27, in a reversed manner to reproduction, produces a parity symbol as an error-correcting code based on the data on the memory 25, and write it on the memory 25. Thus, the data on the memory 25 is read out in a constant cycle, and sent to the recording circuit 26. The recording circuit 26 adds a redundant section including a block number, a pattern for synchronization, etc. to the data, and records the data with the additional redundant section on the magnetic tape 39 through the recording head 21 by using a suitable pattern for magnetic recording. In this way, information on the magnetic tape 39 is rewritten from previous information to new information recorded through the recording head 21.

In the case of executing punch-in/out operations, the aforementioned recording process is performed after setting the changeover switch 31 to energize the reproduction circuit 22. Thus, while sound derived from reproduction information data is being released, the reproduction information data is recorded in the memory 25 in accordance with the interleaving sequence. Further, a parity symbol as an error-correcting code is produced by the error correction circuit 27 according to the reproduction information data on the memory 25, and recorded in the memory 25. The reproduction information data on the memory 25 is read out from an address indicated by a symbol pointer (for example, a compensated symbol pointer $S_4$ as shown in FIG. 1) in a constant cycle in response to the symbol clock $S_1$, supplemented by a redundant section including a block number, pattern for synchronization, etc., and re-recorded on the magnetic tape 39 through the recording head 21 by using a suitable pattern for magnetic recording.

By switching the changeover switch 31 to the audio input terminal 38 at a punch-in point on the magnetic tape 39 where rewriting is started, external audio data is recorded in the memory 25 in accordance with the interleaving sequence through the audio input terminal 38 and A/D converter 32. Further, a parity symbol as an error-correcting code is produced by the error correction circuit 27 according to the external audio data on the memory 25, and recorded in the memory 25. As with the above process, the external audio data on the memory 25 is read out from an address indicated by a symbol pointer in a constant cycle in response to the symbol clock $S_1$, supplemented by a redundant section including a block number, pattern for synchronization, etc., and re-recorded on the magnetic tape 39 through the recording head 21.

Then, by switching the changeover switch 31 to the reproduction circuit 22 at a punch-out point on the magnetic tape 39 where the rewriting is completed, data to be recorded in the memory 25 is changed from the external audio data to the reproduction information data, and thereafter the re-recording on the magnetic tape 39 is performed in the same way as the process before the punch-in operation.

In this case, an address to be given to the information data when it is written in the memory 25 is indicated by the compensated symbol pointer $S_4$ generated by the B-counter 4. The compensated symbol pointer $S_4$ is set by taking into account a deviation between the actual inter-head travelling time $T_1'$ and the standard signal processing time $T_2$. With the arrangement, the standard signal processing time $T_2$ is corrected so that actual signal processing time may equal the actual inter-head travelling time $T_1'$. For such compensation functions, there are two methods, that is, a fixed compensation method (used for adjustment before shipment), wherein a compensated value is fixed by the use of an actual value of the distance between the heads, and an automatic compensation method wherein compensation is automatically performed in response to changing factors such as tape speed deviations or stretch or shrinkage of the tape. The following description will discuss these compensation functions in detail.

To begin, relationships between conditions such as the inter-head travelling time and signal processing time are described by means of concrete examples of their values.

As aforementioned, PCM data with an additional redundant section is divided and recorded onto, for example, 20 tracks on the magnetic tape 39. The PCM data is obtained by successively sampling audio signals of two channels (right and left) by the use of a sampling frequency 48 KHz and quantizing each of them with 16 bits. The redundant section is composed of a parity symbol as an error-correcting code, a block number, a pattern for synchronization, etc. When the standard tape speed $V_o = 47.6$ mm/sec, and the standard reproduction bit rate per track $R_o = 120$K bit/sec, the standard recording density is given by: $R_o/V_o = 2.52$K bit/mm.

Further, the standard inter-head distance HA between the advanced reproduction head 20 and the recording head 21 is set to substantial 9.8 mm which is a figure obtained by adding some allowance to, for example, 8.8 mm which is an interleaving length in S-DATs. Therefore, when the magnetic tape 39 travels between the heads 20, 21 at the standard tape speed $V_o$ ($=47.6$ mm/sec), the required standard inter-head travelling time $T_1$ is given by:

$$T_1 = HA/V_o \approx 0.206 \text{ sec.}$$

Meanwhile, suppose the standard tape speed $V_o$ increases by 5% for any reason, recordings are made on the tape at a tape speed of 50 mm/sec. In the case of performing a reproducing operation on this tape at the standard speed of 47.6 mm/sec, since PCM data is released from the reproduction circuit 22 in response to the sampling frequency of 48 KHz, underflow occurs in the memory, causing the signal to be interrupted. However, in an actual operation, since the tape speed is controlled by the servo system so that the reproduction bit rate may be kept at the standard reproduction bit rate $R_o$ of 120K bit/sec, it is changed to 50 mm/sec, the same speed as that in the recording operation.

In the case of stretch or shrinkage of the tape after recording, the same mechanism functions. For example, after recordings are made at a tape speed of 47.6 mm/sec and a bit rate of 120K bit/sec, even if the tape length is extended by 5% for any reason, the same control mechanism permits the tape speed to be changed to 50 mm/sec so as to maintain the reproduction bit rate at 120K bit/sec.

As described above, in the case of a tape speed deviation in recording or stretch or shrinkage of a tape after recording, the tape speed is controlled by the servo system to be set at a different value from the standard tape speed $V_o$, resulting in a change in the inter-head travelling time $T_1'$.

On the other hand, supposing a sift register is employed as the memory, the signal processing time in the signal processing circuit wherein signals are processed according to a constant clock, can be altered by changing the number of stages of the hypothetical shift register. In addition, the number of the stages of the hypothetical shift register is represented by the number of symbols, supposing one symbol for digital information is recorded in each stage of the shift register. Further, changing the number of stages of the shift resister means changing a position which is specified by an address and from which the memory is read out. When one symbol is composed of eight bits, standard delay time required for one symbol to be read out from one stage of the hypothetical shift register is expressed by: $8/R_o = 67\mu$-sec. In order to permit the standard signal processing time $T_2$ to coincide with the standard inter-head travelling time $T_1$ in accordance with the standard tape speed $V_o$, the required standard number of stages $D_2$ of the hypothetical shift register is given by: $(R_o \cdot T_1)/8$ TM 3090 stages. Therefore, when the standard signal processing time $T_2$ per track is converted into blocks, it corresponds to 103 blocks in the case of composing one block from 30 symbols. When the number of the stages of the hypothetical shift register is greater than the standard number of stages $D_2$, actual signal processing time $T_2'$ becomes longer than the standard signal processing time $T_2$. When the number of the stages of the hypothetical shift register is smaller than the standard number of stages $D_2$, the actual signal processing time $T_2'$ becomes shorter than the standard signal processing time $T_2$.

Figure 3A:
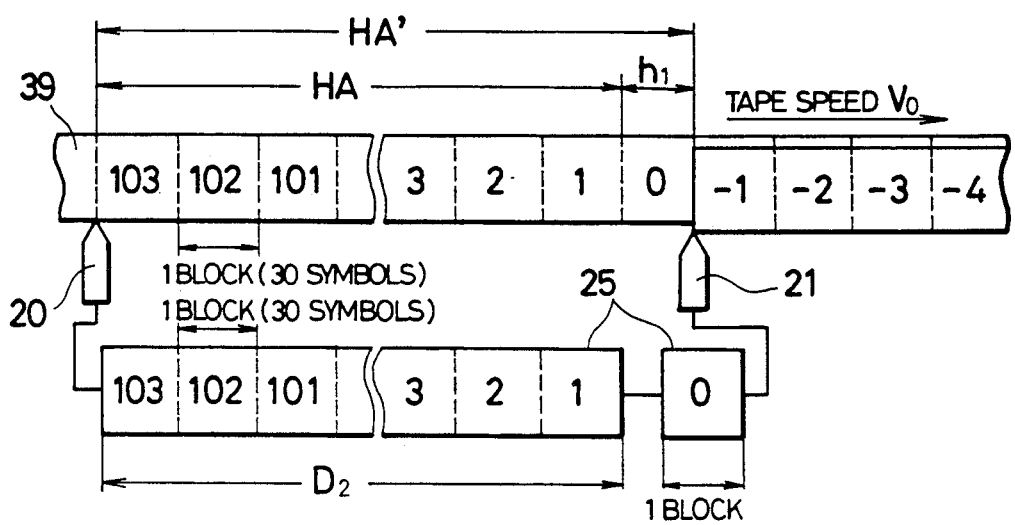
FIG. 3(a) is an explanatory diagram showing data arrays on a magnetic tape and a memory in the case of correcting a recording position for an error associated with an inter-head distance.

As shown in FIG. 3(a), suppose the actual inter-head distance $HA'$ between the advance reproduction head 20 and the recording head 21 is extended a length $h_1$ (for example, $h_1 = 0.1$ mm) from the standard inter-head distance due to an installation error. Without correcting a recording position, a recording start position on the magnetic tape 39 would be dislocated $h_1$, and therefore data of $(R_o/V_o) \cdot h_1$ per one track would be lost from the data sequence on the memory 25. In this case, the actual inter-head travelling time $T_1'$ is expressed by:

$$T_1' = \frac{HA + h_1}{V_o} \quad (\simeq 0.208 \text{ sec}) \tag{1}$$

Therefore, a deviation between the actual inter-head travelling time $T_1'$ and the standard signal processing time $T_2$ is given by: $T_1' - T_2 = T_1' - T_1 \simeq 2.1$ msec. When this deviation is converted into the number of blocks, it corresponds to substantial one block. As a result, as shown in FIG. 3(a), an increase of the number of stages of the hypothetical shift register by one block (=30 symbols) can correct the dislocation of the recording start position due to the inter-head distance deviation $h_1$.

Figure 4A:
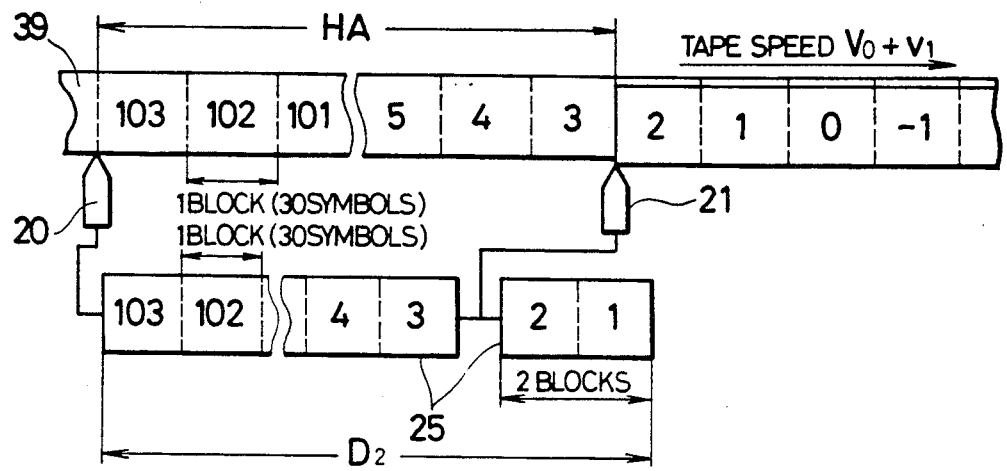
FIG. 4(a) is an explanatory diagram showing data arrays on the magnetic tape and the memory in the case of correcting a recording position for a deviation of a tape speed.

Moreover, as shown in FIG. 4(a), suppose an inter-head distance is equal to the standard inter-head distance $HA$ and a tape speed during recording is faster than the standard tape speed $V_o$ by $v_1$ (for example, $v_1 = 0.9$ mm/sec), the tape speed in punch-in operation is expressed by $V_o + v_1$, which is the same as that in the recording operation, through the control of the servo system, as aforementioned. Under these conditions, if a punch-in operation is performed without correcting a recording position, a recording start position on the tape 39 will lag behind by $(v_1 + V_o) \cdot HA$. In this case, the actual inter-head travelling time $T_1'$ is expressed by:

$$T_1' = \frac{HA}{V_o + v_1} \quad (\simeq 0.202 \text{ sec}) \tag{2}$$

Therefore, a deviation is given by: $T_1' - T_2 \simeq 4.0$ msec. When this deviation is converted into the number of blocks, it corresponds to $-2$ blocks. As a result, as shown in FIG. 4(a), a reduction of the number of stages of the hypothetical shift register by two blocks (=60 symbols) can correct the dislocation of the recording start position.

The following description will discuss a case where the punch-in/out operations are performed on the magnetic tape 39 having a stretch by $a\%$. Here, an inter-head distance is supposed to be equal to the standard inter-head distance $HA$ and a tape speed during recording and reproduction is supposed to be the standard tape speed $V_o$. In this case, as aforementioned, the tape speed is controlled by the servo system so that the reproduction bit rate may be kept at the standard reproduction bit rate $R_o$. Therefore, the inter-head travelling time $T_1'$ can be calculated by substituting $v_1 = (a/100) \cdot V_o$ in the above equation (2). Thus, a dislocation of a recording start position can be corrected by reducing the number of stages of the hypothetical shift register according to a deviation between the times $T_1'$, $T_2$.

Furthermore, in the case where the inter-head distance deviation $h_1$, tape speed deviation $v_1$ during recording and stretch by $a\%$ of the magnetic tape 39 after recording simultaneously exist, the inter-head travelling time $T_1'$ is given by the following equation (3). Eventually, a dislocation of a recording position can be corrected by increasing or reducing the number of stages of the hypothetical shift register according to a deviation between the times $T_1'$, $T_2$.

$$T_1' = \frac{HA + h_1}{V_o + v_1 + V_o(a/100)} \tag{3}$$

In order to obtain the above compensation operations, the actual inter-head distance $HA'$ is found by the microprocessor 9 installed in the symbol pointer generation circuit of the reproduction circuit 22 through the inter-head distance setting switch 10, whereas the actual inter-head travelling time $T_1$, is found by the microprocessor 9 according to the above equations (1) to (3). The tape speed deviation $v_1$ for finding the inter-head travelling time $T_1$, is obtained through the FG pulse 11 from the capstan motor 34, as aforementioned. Further, the microprocessor 9 calculates a deviation $(T_1' - T_2)$ to the standard signal processing time $T_2$, and the offset signal $S_9$ indicating the number of symbol clock pulses corresponding to the deviation is released from the microprocessor 9.

Figure 3B:
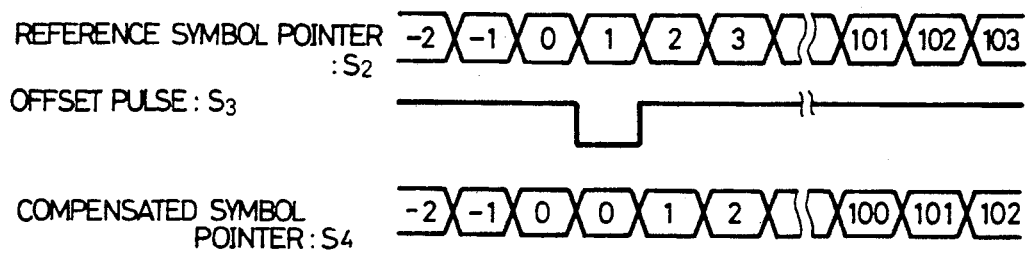
FIG. 3(b) is a timing chart showing a generation process of a compensated symbol pointer in the case of performing the compensation shown in FIG. 3(a).

Meanwhile, the A-counter 2 releases the reference symbol pointer $S_2$, and the B-counter 4 releases the compensated symbol pointer $S_4$. The comparator 3 whereto the offset signal $S_9$ is entered, compares the pointers $S_2$ and $S_4$, and releases the offset pulse $S_3$ to the B-counter 4 so that a count difference corresponding to the deviation indicated by the offset signal $S_9$ may be produced between the pointers $S_2$ and $S_4$. As shown in FIG. 3(a), if it is necessary to read out data from the memory 25 with a time delay corresponding to one block (30 symbols) so as to record the data on the magnetic tape 39, the comparator 3 releases the offset pulse $S_3$ to the B-counter 4 when the reference symbol pointer $S_2$ shows "1", as shown in FIG. 3(b). Thus, the B-counter is reset, and since the compensated symbol pointer $S_4$ returns to "0" (initial value), the B-counter 4 re-counts from this value on. As a result, a count value of the B-counter 4 (that is, an actual data read-out sequence for the memory 25) changes with a delay of one block (30 symbols) from that of the A-counter 2 (that is, a standard data read-out sequence for the memory 25). Additionally, in the present embodiment, the data read-out sequence for the memory 25 is indicated by the block numbers of the data.

Figure 4B:
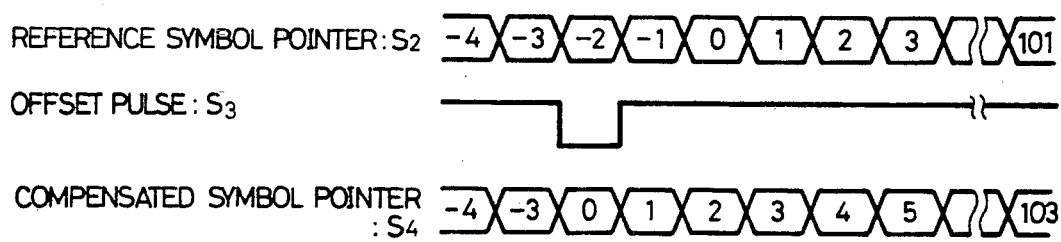
FIG. 4(b) is a timing chart showing a generation process of a compensated symbol pointer in the case of performing the compensation shown in FIG. 4(a).
Figure 5A:
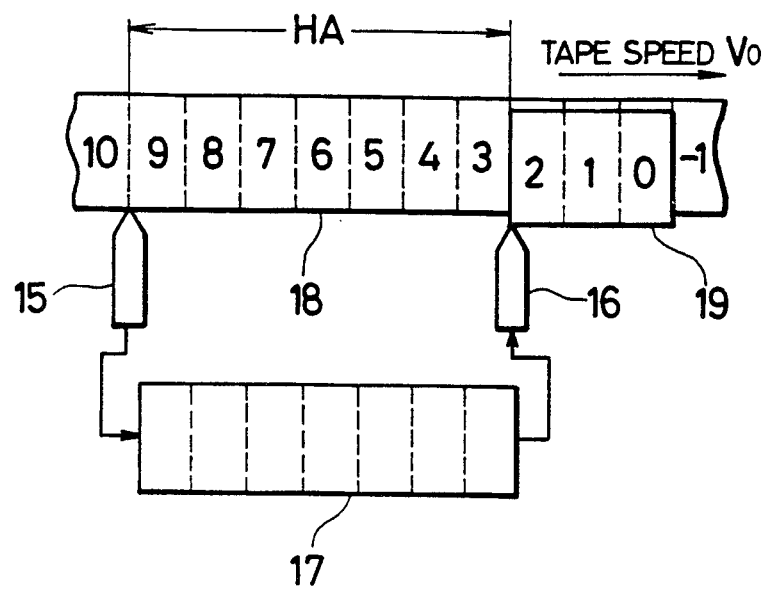
FIG. 5(a) is an explanatory diagram showing data arrays on the magnetic tape and the memory in the case where ideal punch-in/out operations are performed.
Figure 5B:
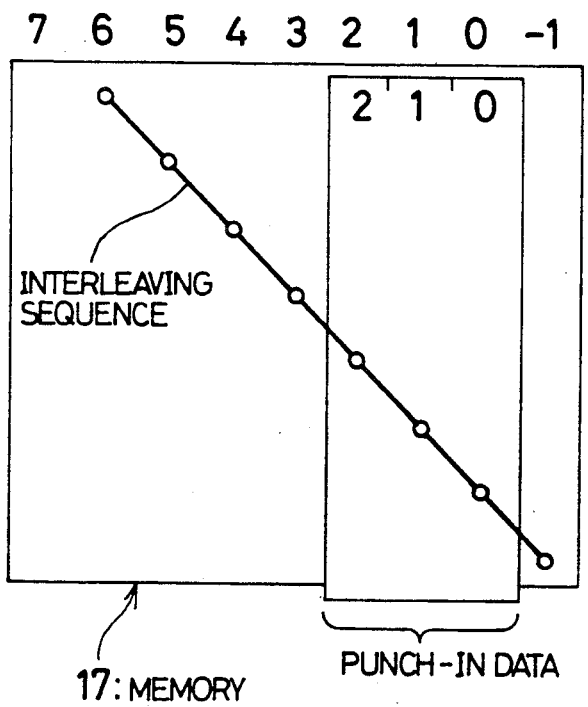
FIG. 5(b) is an explanatory diagram showing continuity of an interleaving sequence when data on the magnetic tape shown in FIG. 5(a) is arrayed on the memory based on its block numbers.

On the other hand, as shown in FIG. 4(a), if it is necessary to read out data from the memory 25 with a time advanced corresponding to two blocks (60 symbols) so as to record the data on the magnetic tape 39, the comparator 3 releases the offset pulse $S_3$ to the B-counter 4 when the reference symbol pointer $S_2$ shows "$-2$" before coming to "0", as shown in FIG. 4(b). As a result, the compensated symbol pointer $S_4$ changes with a advanced of two blocks (60 symbols) from the reference symbol pointer $S_2$.

As aforementioned, the compensated symbol pointer $S_4$ indicates a delayed or preceded read-out sequence from the read-out sequence indicated by the reference symbol pointer $S_2$, and further corresponds to a deviation of the actual inter-head travelling time $T_1'$ to the standard signal processing time $T_2$.

Thus, the compensated symbol pointer $S_4$ is successively released to the table ROM 7 in the interleaving circuit 29 through the pointer bus 24 (selector 5). As a result, while the compensated symbol pointer $S_4$ is being converted into an address on the memory 25, reproduction information data is read out from the corresponding address on the memory 25, and recorded on the magnetic tape 39.

Figure 6A:
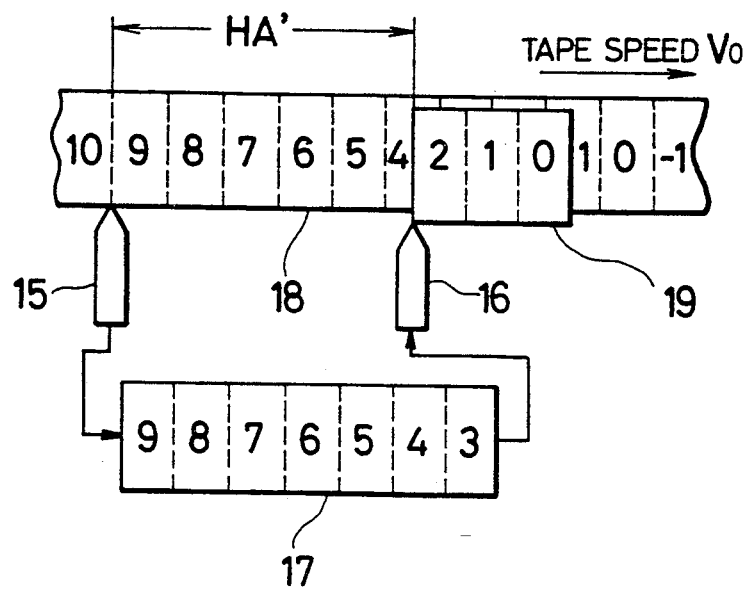
FIGS. 6(a) (b) and (c) show the prior art.
Figure 6B:
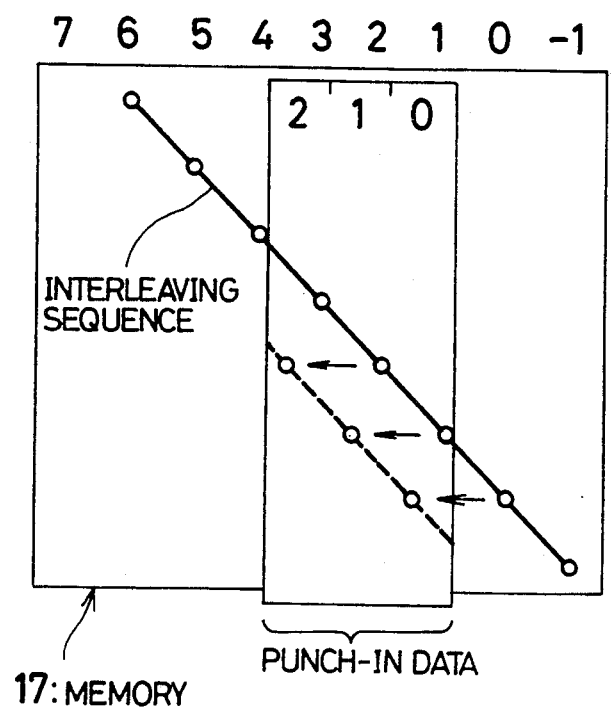
FIG. 6(b) is an explanatory diagram showing discontinuity of an interleaving sequence when data on the magnetic tape shown in FIG. 6(a) is arrayed on the memory based on its block numbers.
Figure 6:
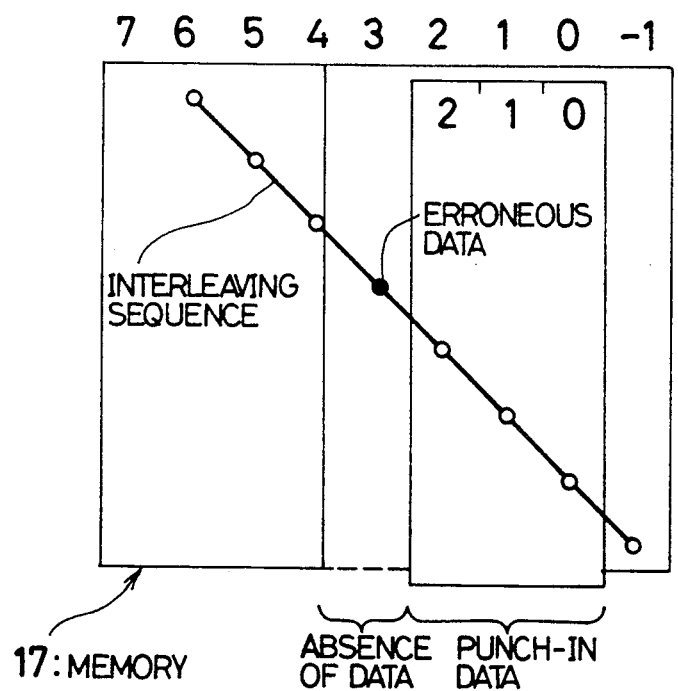
FIG. 6(c) is an explanatory diagram showing data arrays on the memory after having applied error-correcting processing to the data on the memory shown in FIG. 6(b).

In this manner, the reproduction information data is read out from the memory 25 according to the compensated symbol pointer $S_4$ which is corrected so as to indicate a preceded or delayed block number in accordance with a deviation of the actual inter-head travelling time $T_1'$ to the standard signal processing time $T_2$. As a result, since the signal processing precedes or delays in response to the travelling state of the magnetic tape 39, the occurrence of discontinuity in the interleaving sequence (for example, shown in FIG. 6(b) as the prior art) due to underflow or overflow before and after the punch-in/out point can be avoided. Therefore, when recordings on the magnetic tape 39 are reproduced, the reproduction information data is restored to its original array by the deinterleaving process. Thus, the occurrence of unusual data retaining no correlation to the original data can be avoided, thereby preventing noise generation. Moreover, when a discontinuity of the interleaving sequence is corrected by interpolation, the compensation capability of the error correction circuit 27 tends to be lowered; however, in the arrangement of the present embodiment, which has no discontinuity of the interleaving sequence, the correction capability against noise of common occurrence can be improved.

Furthermore, since a recording position is automatically corrected in response to a tape speed deviation $v_1$ caused by an actual inter-head distance $HA'$, a tape speed during recording, stretch or shrinkage of a tape after recording or other reason, accuracy required for such mechanisms as to provide an inter-head distance, tape speed or the like and tolerance in stretch or shrinkage of a tape are alleviated significantly, compared with those in the prior art. Especially, since the accuracy required for the inter-head distance is alleviated, adjustment for parallelism required for the advanced reproduction head 20 and recording head 21 after their installation can be alleviated. Since degrees of freedom for various adjustments in many adjustment processes, such as adjustment for azimuth angles, can be increased, work efficiency in the assembly process of the S-DAT is improved significantly. Furthermore, since accuracy required for tape speed and tolerances in stretch or shrinkage of a tape are alleviated, even in the case of editing a magnetic tape 39 whose recordings are made by using different devices or whose recordings are made long time ago, noise generation at punch-in/out positions can be prevented. Thus, interchangeability of the magnetic tape 39 is improved, and reliability for the recordings of the magnetic tape 39 as well as for the devices is enhanced.

In the above embodiment, the arrangement is made such that the compensated symbol pointer $S_4$ is permitted to possess a phase difference to the reference symbol pointer $S_2$ through the offset pulse $S_3$ and the phase difference corresponds to a deviation indicated by the offset signal $S_9$. Meanwhile, for example, as is described in Publication for examined Japanese Patent Application (5267/1990)(Tokukouhei 2-5267), another arrangement may be suggested, wherein an offset value corresponding to a deviation between the inter-head travelling time and the standard signal processing time is generated as a digital signal, and this signal is added or subtracted to or from a reference sequencing signal (corresponding to the reference symbol pointer $S_2$ in the present embodiment). However, in the above arrangement, in order to improve resolution when correcting a deviation between the inter-head travelling time and the standard signal processing time, it is necessary to increase the number of digits of the adder, resulting in a problem in that the circuit configuration becomes larger. On the contrary, in the arrangement of the present invention, a phase difference between the compensated symbol pointer $S_4$ and the reference symbol pointer $S_2$ is utilized for correcting a deviation between the inter-head travelling time and the standard signal processing time, and therefore resolution can be improved by the use of the same arrangement. Thus, a simplified arrangement can be achieved without the necessity of a large circuit configuration.

Additionally, in the above description, the speed of the magnetic tape 39 is controlled by the servo control circuit 13 so as to obtain a predetermined standard reproduction bit rate $R_o$. However, the present invention is not limited to this arrangement, and is adaptable to the case where this type of control by the servo system is not performed and the reproduction bit rate $R_o'$ varies. In this case, as shown by a broken line 12, in FIG. 1, the reproduction symbol clock 12 is directly entered to the microprocessor 9. The microprocessor 9 calculates an actual signal processing time $T_2'$ according to the following equation (4) using the reproduction bit rate $R_o'$ and the number of stages $D$ of the hypothetical shift register as parameters.

$$T_2' = \frac{8 \cdot D}{R_o'} \tag{4}$$

A recording position can be corrected by increasing or decreasing the number of the stages $D$ of the hypothetical shift register so that $T_2'$ may equal the actual inter-head travelling time $T_1'$ of the magnetic tape 39.

Moreover, the comparator 3 as the phase difference generation circuit is designed so as to release the offset pulse $S_3$ as the reset pulse as is shown in FIG. 3(b) and FIG. 4(b); however, the comparator 3 may be designed so as to release, for example, a preset pulse, load pulse, or clock stop signal.

As described above, in the recording position compensation circuit of the digital information recording-reproduction apparatus according to the present invention, information data is automatically read out from the memory so that the signal processing time from the reproduction to the re-recording may coincide with the inter-head travelling time; therefore, continuity of the recordings on the recording medium is not adversely affected. For this reason, even in the case of editing operations such as punch-in/out operations, dislocation of the recording positions which is caused by an inter-head distance error, a tape speed deviation, stretch or shrinkage of the tape after recording, can be avoided. Thus, noise generation during reproduction can be prevented.

The invention being thus described, it may be obvious that the same may be varies in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A recording position compensation circuit for use in a digital information recording-reproduction apparatus in accordance with the present invention comprising:

advanced reproduction head means disposed at a upstream position in a travelling path of a recording medium;

recording head means disposed at a downstream position in the travelling path of the recording medium;

memory means for successively storing in a predetermined address digital information to be recorded on the recording medium through the recording head means;

offset generation means for generating an offset signal indicating a deviation between standard signal processing time, which is required for a process wherein digital medium information recorded on the recording medium is reproduced through the advanced reproduction head means and re-recorded on the recording medium through the recording head means, and inter-head travelling time which is required for the recording medium to travel a distance from the advanced reproduction head means to the recording head means;

reference read-out sequence generation means for generating a reference sequencing signal indicated a reference of a sequence whereby the digital information stored in the memory means is read out so that a part of the digital medium information is rewritten through the recording head means;

compensation read-out sequence generation means for generating a compensation sequencing signal indicating an actual sequence whereby the digital information stored in the memory means is read out so that a part of the digital medium information is rewritten through the recording head means;

phase difference generation means for generating a phase difference signal which resets the compensation read-out sequence generation means so as to bring about a phase difference between the reference sequencing signal and the compensation sequencing signal, the phase difference signal corresponding to a deviation indicated by the offset signal; and address generation means for specifying an address in the memory means required for reading out the digital information stored in the memory means, based on the compensation sequencing signal.

2. The recording position compensation circuit for use in the digital information recording-reproduction apparatus as set forth in claim 1, further comprising reproduction circuit means for producing a reproduction information symbol according to the medium information reproduced from the recording medium through the advanced reproduction head means.

3. The recording position compensation circuit for use in the digital information recording-reproduction apparatus as set forth in claim 2, wherein the memory means comprises a shift register for storing digital information of one symbol per stage, that is, 8 bits per stage, whereby, suppose a standard distance between the advanced reproduction head means and the recording head means is HA; the recording medium travels at a speed of $V_o$; the medium information is reproduced at a standard reproduction bit rate $R_o$ per track through the advanced reproduction head means; and the number of standard stages per track which is required for the shift register is $D_2$; the following equation holds in the recording position compensation circuit of the digital information recording-reproduction apparatus:

$$D_2 = \frac{R_o \cdot HA}{8 \cdot V_o}.$$

4. The recording position compensation circuit for use in the digital information recording-reproduction apparatus as set forth in claim 3, wherein the reference read-out sequence generation means comprises a first counter, the first counter being arranged to count symbol clock pulses generated according to the standard reproduction bit rate $R_o$ and generate a reference symbol pointer indicating a reference sequence required in reading out for every unit of symbol the digital information stored in the shift register.

5. The recording position compensation circuit for use in the digital information recording-reproduction apparatus as set forth in claim 4, wherein the offset generation means comprises a microprocessor, the microprocessor being arranged to store the standard distance HA, standard speed $V_o$, standard reproduction bit rate $R_o$ and standard signal processing time, and to calculate a deviation between the standard signal processing time and actual inter-head travelling time required for the recording medium to travel from the advanced reproduction head means to the recording head means, the offset signal being adapted to represent the number of the symbol clock pulses corresponding to the deviation.

6. The recording position compensation circuit for use in the digital information recording-reproduction apparatus as set forth in claim 5, wherein the compensation read-out sequence generation means comprises a second counter, the second counter being arranged to count the symbol clock pulses and generate a compensated symbol pointer indicating an actual sequence required in reading out for every unit of symbol the digital information stored in the shift register.

7. The recording position compensation circuit for use in the digital information recording-reproduction apparatus as set forth in claim 6, wherein the phase difference generation means comprises a comparator; the phase difference signal is an offset pulse released from the comparator; and the offset pulse resets the second counter so that a difference between the sequence indicated by the reference symbol pointer and that indicated by the compensated symbol pointer may coincide with the number of symbol clock pulses indicated by the offset signal.

8. The recording position compensation circuit for use in the digital information recording-reproduction apparatus as set forth in claim 5, further comprising:

drive means for permitting the recording medium to travel and generating a pulse signal corresponding to a travel speed of the recording medium;

servo control means for generating a medium speed controlling voltage and controlling the travel speed of the recording medium by using the medium speed controlling voltage so that the medium information is reproduced at the standard reproduction bit rate $R_o$ per track through the advanced reproduction head means; and inter-head distance setting means for entering to the microprocessor an actual inter-head distance between the advanced reproduction head means and the recording head means, the microprocessor being adapted to calculate actual inter-head travelling time based on the actual inter-head distance and the medium speed deviation derived from the pulse signal.

9. The recording position compensation circuit for use in the digital information recording-reproduction apparatus as set forth in claim 2, wherein the address generation circuit comprises an interleaving circuit for specifying an address in the memory means, which is required in interleaving processing and deinterleaving processing.

10. The recording position compensation circuit for use in the digital information recording-reproduction apparatus as set forth in claim 9, wherein the interleaving circuit comprises a ROM provided with a table for converting the compensation sequencing signal into an address in the memory means.

11. The recording position compensation circuit for use in the digital information recording-reproduction apparatus as set forth in claim 1, further comprising:

switching means for switching between one case where the medium information reproduced from the recording medium through the advanced reproduction head means is re-recorded in the recording medium and another case where a part of the medium information is rewritten by recording on the recording medium external audio data supplied from an external device, through the recording head means.

12. A method for rewriting a part of digital medium information already recorded on a recording medium in a recording position compensation circuit of a digital information recording-reproduction apparatus, comprising the steps of:

calculating through offset generation means a deviation between standard signal processing time, which is required for a process wherein digital medium information already recorded on recording medium is reproduced through advanced reproduction head means and re-recorded on the recording medium through recording head means, and inter-head travelling time which is required for the recording medium to travel a distance from the advanced reproduction head means to the recording head means;

generating a reference sequencing signal through reference read-out sequence generation means such that the reference sequencing signal successively specifies an address in memory means according to a reference clock when digital information successively read out from the memory means is recorded on the recording medium through the recording head means under a condition that the deviation is 0; and generating a compensation sequencing signal through compensation read-out sequence generation means so that the compensation sequencing signal has a phase difference corresponding to the deviation with respect to the reference sequencing signal, whereby if the inter-head travelling time is longer than the standard signal processing time, compensation is performed so that a phase of the compensation sequencing signal may proceed slower than that of the reference sequencing signal, and if the inter-head travelling time is shorter than the standard signal processing time, compensation is performed so that the phase of the compensation sequencing signal may proceed faster than that of the reference sequencing signal.

13. The method as set forth in claim 12, further comprising the steps of:

reading out the medium information through the advanced reproduction head means;

producing a reproduction information symbol through the reproduction circuit means according to the read-out medium information;

successively storing the reproduction information symbol in an address of the memory means specified by address generation means;

producing reproduction information data by applying error-correcting processing, deinterleaving processing and interpolation processing to the reproduction information symbol stored in the memory means, and then successively storing the reproduction information data in an address of the memory means specified by the address generation means through switching means; and producing recording data by applying interleaving processing and error-correcting code adding processing to the reproduction information data read out from an address of the memory means in accordance with the compensation sequencing signal and further adding a predetermined redundant section thereto, and then re-recording the recording data on the recording medium through the recording head means.

14. The method as set forth in claim 13, further comprising the step of:

converting the reproduction information data into an analog signal so as to release it as sound.

15. The method as set forth in claim 13, further comprising the steps of:

switching the switching means to an external sound input terminal at a punch-in point where rewriting of a part of the medium information is to be started;

successively storing the external audio data in an address of the memory means specified by the address generation means through the external sound input terminal, a D/A converter and the switching means;

producing recording data by applying interleaving processing and error-correcting code adding processing to the external audio data read out from an address of the memory means in accordance with the compensation sequencing signal and further adding a predetermined redundant section thereto, and then recording the recording data on the recording medium through the recording head means, thereby rewriting the part of the medium information; and switching the switching means to the reproduction circuit means at a punch-out point where the rewriting of the part of the medium information is to be completed.

16. The recording position compensation circuit for use in the digital information recording-reproduction apparatus as set forth in claim 4, wherein the offset generation means comprises a microprocessor, the microprocessor being arranged to calculate actual signal processing time through actual reproduction bit rate $R_o$, and the number of the stages D of the shift register, and to calculate a deviation between the signal processing time and actual inter-head travelling time required for the recording medium to travel from the advanced reproduction head means to the recording head means, the offset signal being adapted to represent the number of the symbol clock pulses corresponding to the deviation.

* * * * *